United States Patent
Joki et al.

(10) Patent No.: US 6,523,383 B2
(45) Date of Patent: Feb. 25, 2003

(54) MONITORING AND CONTROLLING SYSTEM WITH CONNECTORLESS QUICK-CHANGE COMPONENTS

(75) Inventors: Mark A. Joki, Dover, OH (US); David G. Beechy, Sugarcreek, OH (US); Kevin E. Rehfus, North Canton, OH (US); Raymond A. Severyn, Brecksville, OH (US); Kenneth W. Lindsay, Massilon, OH (US)

(73) Assignee: The Timken Company, Canton, OH (US)

( * ) Notice: Subject to any disclaimer, the term of this patent is extended or adjusted under 35 U.S.C. 154(b) by 35 days.

(21) Appl. No.: 09/750,958

(22) Filed: Dec. 28, 2000

(65) Prior Publication Data

US 2002/0129633 A1 Sep. 19, 2002

(51) Int. Cl.[7] ................................................ B21B 37/58
(52) U.S. Cl. .................... 72/13.4; 72/10.1; 72/10.4; 72/12.2; 72/14.4; 72/31.07
(58) Field of Search ................................ 72/10.1, 10.4, 72/12.2, 13.4, 14.4, 31.07; 340/682, 870.3; 384/448

(56) References Cited

U.S. PATENT DOCUMENTS

| | | | |
|---|---|---|---|
| 3,740,982 A | | 6/1973 | Hacker et al. |
| 4,242,666 A | | 12/1980 | Reschovsky et al. |
| 4,939,920 A | | 7/1990 | Stahl et al. |
| 5,226,736 A | | 7/1993 | Becker et al. |
| 5,311,562 A | | 5/1994 | Palusamy et al. |
| 5,353,009 A | | 10/1994 | Marsh et al. |
| 5,697,240 A | * | 12/1997 | Parker ........................ 72/31.05 |
| 5,805,080 A | * | 9/1998 | Lemoine et al. ......... 340/870.3 |
| 5,898,388 A | * | 4/1999 | Hofmann et al. ........ 340/870.3 |
| 6,161,962 A | * | 12/2000 | French et al. ................ 384/448 |
| 6,331,823 B1 | * | 12/2001 | El-Ibiary ..................... 340/682 |

FOREIGN PATENT DOCUMENTS

WO    9811356    3/1998

OTHER PUBLICATIONS

Patent Abstract from Japan, publication No: 2000280011, publication date Oct. 10, 2000, Inventor: Yarita Yukio.
Smart Transmitter Using Microwave Pulses To Measure The Levels of Liquids and Solids in Process Applications, Author Hugo Lang et al., 1993.
Don A. G. Pedder, A Contactless Electrical Energy Transmission System, Feb. 1999, pp. 23–30.
Wireless Data Corporation, Measurements from Rotating Equipment . . . Around the World, May 1995, Pertinent Pages—All.
Balluff, Solutions For Troublesome Connections, Jan. 1999, Pertinent Pages—All.

\* cited by examiner

Primary Examiner—Ed Tolan
(74) Attorney, Agent, or Firm—Polster, Lieder Woodruff & Lucchesi, L.C.

(57) ABSTRACT

A monitoring and controlling system for monitoring and controlling various operating characteristics of machine components. The monitoring and controlling system includes a primary transceiver, with sensors and control devices, mounted integrally with the monitored component. The primary transceiver communicates with a secondary transceiver and receives its electrical power from the secondary transceiver without use of interconnecting communication or power cables. The integrated mounting of the primary transceiver and sensors within the monitored component without the use of interconnecting cables allows for replacement of the monitored component in harsh operating environments without the risk of damage to interconnecting electrical connectors and cables. The operating data detected by the sensor for the monitored component is communicated by the primary transceiver and the secondary transceiver to a monitoring network which analyzes the data to determine the need for maintenance of the monitored component.

35 Claims, 8 Drawing Sheets

MONITORING AND CONTROLLING SYSTEM WITH CONNECTORLESS QUICK-CHANGE COMPONENTS

BACKGROUND OF THE INVENTION

This invention relates in general to a monitoring and controlling system and, more particularly, to a monitoring and controlling system having connectorless quick change components.

Monitoring and controlling systems are used in virtually every area of industry to provide feedback regarding the operation of mechanical and electromechanical equipment. In many of these applications, the working environments are very harsh and may require the monitoring and controlling systems to function within extreme heat or extreme humidity. In other applications the monitoring and controlling systems are continuously exposed to a wide variety of damaging contaminants. In such situations, the robustness of the monitoring and controlling system can be problematic because the electrical and electronic devices needed to provide proper monitoring capability are easily compromised by the various damaging attributes of such hostile environments.

This is particularly true regarding the connectors and cable assemblies normally needed to create a monitoring and controlling system capable of providing relevant information regarding the operating characteristics of a monitored component. Present monitoring and controlling systems normally use such connectors and cable assemblies to connect the sensors within the monitored component to the monitoring network. When indicated by the monitoring and controlling system, the monitored component must eventually be serviced or replaced and during this maintenance, the connectors and cable assemblies in current systems must be disconnected and reconnected. When such connectors and cables are disconnected and reconnected within hostile working environments, contaminants can enter the connectors and cables, thereby damaging the connectors and electrical connections. Once damaged, these components either cease to provide consistent reliable data links to a monitoring and controlling system's sensors, or totally fail to provide any required data at all.

A primary example of the use of a monitoring and controlling system in a harsh operating environment is the mill rolling machine used in steel mills. Mill rolls, which are used to roll steel and other metals into various shapes, as well as into sheets, operate in extremely harsh environments. Not only do these rolls sustain severe impacts, but they are further subjected to dirt and grease, and some even to water sprays. Roll neck bearings which support mill rolls in the housings of a millstand operate in the same environment. Owing to the harsh environments in which they operate, roll neck bearings fail from time to time, and sometimes the failures have catastrophic results.

Because rolls are exchanged at least daily to maintain product quality, the extensive effort expended in making these exchanges makes it desirable for the bearings, including the monitoring and controlling systems, to be self contained units. Because monitoring and controlling systems for mill roll bearings are susceptible to damage in the harsh rolling mill environment, mill roll bearing monitoring and controlling systems are not extensively used and costly maintenance procedures are often performed more frequently than necessary, simply as a precautionary measure to avoid severely damaging millstands.

SUMMARY OF THE INVENTION

The present invention resides in a monitoring and controlling system which incorporates connectorless quick change components to prevent degradation of the monitoring and controlling system caused by damage to electrical connectors and cables assemblies during replacement and maintenance of the monitored component. Monitoring sensors, controlling devices, and electronic transceiver devices are integrated onto the monitored component and are used to communicate data to a monitoring network regarding various operating characteristics of the monitored component. The integrated sensors, controlling devices, and transceivers obtain their operating power from a connectorless energy transfer system and the transceiver communicates its monitoring data to another closely situated transceiver by means of coupled capacitance plates within each of the transceivers.

The present invention also resides in millstand embodiments of the above invention, including a chock, a mill roll having a roll neck that is received in the chock, an antifriction bearing located between the chock and the roll neck, and a monitoring and controlling system to monitor operational characteristics of the antifriction bearing. The chock contains a sensor and/or controllers that detect control operating conditions of the antifriction bearing. The monitoring and controlling system includes a transceiver mounted in the antifriction bearing chock to which at least one sensor is connected, another transceiver mounted in the millstand which communicates with the chock transceiver, and a monitoring network which receives the signals from the millstand transceiver after those signals have been transmitted to the millstand transceiver by the chock transceiver. Where the configuration of the millstand prevents the near field coupling of the chock transceiver and the millstand transceiver, a pass through enclosure is positioned between the two transceivers to allow for transference of power and communications between the transceivers.

The chock transceiver is mounted in a window of the chock and produces a radio signal which reflects the operating conditions detected by the sensors. The millstand transceiver is mounted within a window in the millstand and receives the radio signal generated by the chock transceiver. Data communication takes place by means of radio frequency communication between coupled capacitance plates within the chock transceiver and the millstand transceiver. The energy needed to operate the chock transceiver is supplied to the chock transceiver from the millstand transceiver by means of a connectorless energy transfer system using induction to transfer electrical energy. Where the millstand transceiver cannot be positioned near the chock transceiver, a pass through enclosure containing ferrite cores and capacitor plates is placed between the transceivers to relay communications and power between the transceivers.

Because data communications occur through use of radio frequency communications, there are no electrical connectors or electrical cables which interconnect the two transceivers for communication purposes. Also, because electrical energy is provided to the chock transceiver by induction, there are no electrical connectors or electrical cables which interconnect the transceivers for power purposes, and there is no potential for unexpected shutdown due to the use of limited life batteries. Therefore, the present invention uses no electrical interconnection devices between the monitored component and the monitoring and controlling system which would be subject to damage from the harsh operating environment of the steel rolling mill.

DETAILED DESCRIPTION OF THE INVENTION

Figure 1:
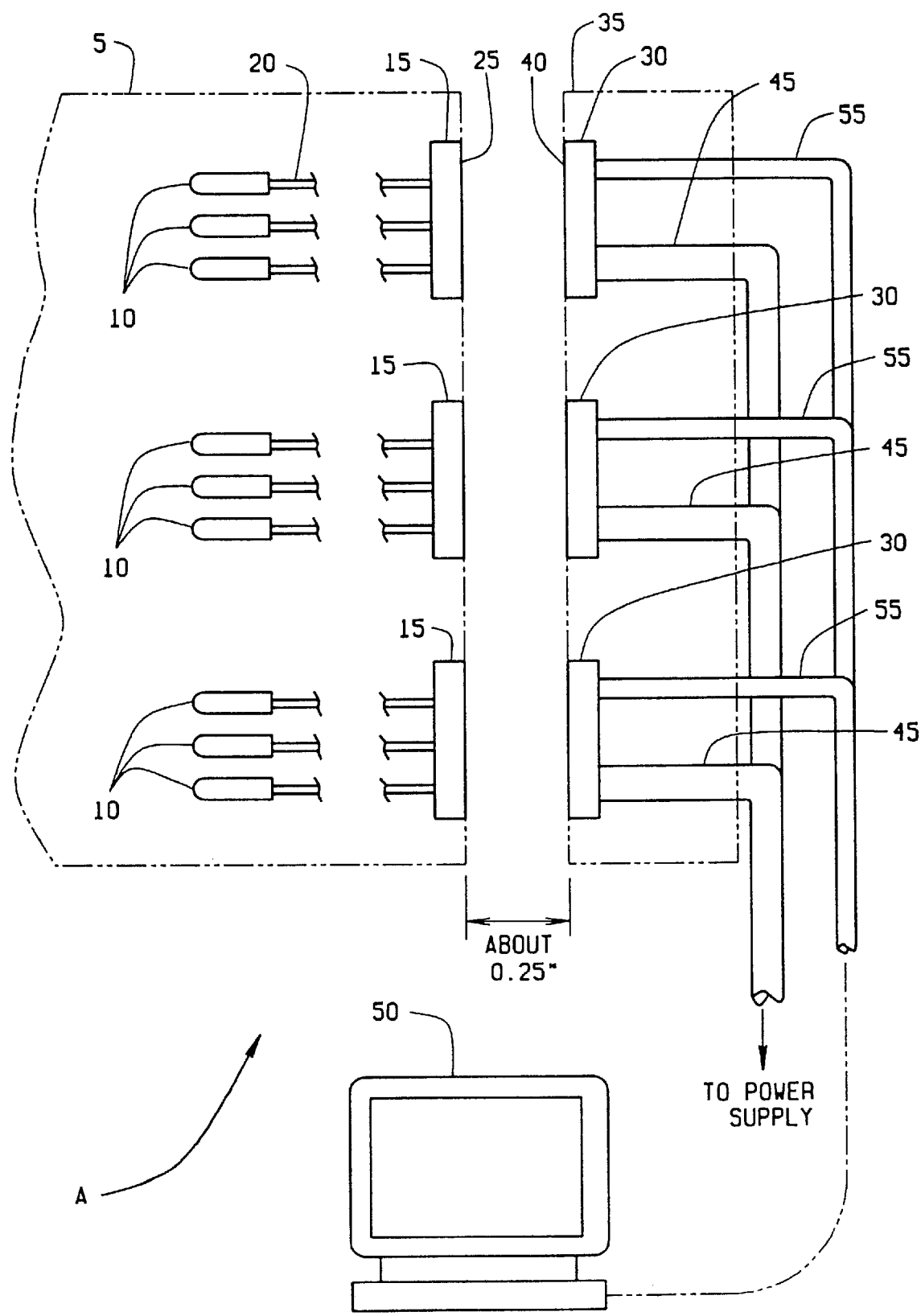
FIG. 1 is a wiring diagram depicting one example for the arrangement of the monitoring and controlling system.

Referring now to the drawings, FIG. 1, a monitoring and controlling system A is shown in one example of a monitoring and controlling system configuration. While the monitoring and controlling system must include at least one set of transceivers, the system shown in FIG. 1 illustrates an example where three sets of transceivers are used. In the configuration shown, a monitored component 5 is designed to contain one or more sensors 10, at least one of which is a temperature sensor. While only a temperature sensor is discussed below, there are several other types of sensors which may be used. Accelerometer sensors and strain sensors are just two examples of the other type of sensors which may be used within the present invention.

Each individual sensor 10 is positioned within the monitored component 5 in a way which allows the sensor 10 to obtain the required operating characteristic of the monitored component which must be monitored. Each sensor 10 is connected to a primary transceiver 15 by means of a sensor conductor 20 which communicates the monitored operating characteristic from the sensor 10 to the primary transceiver 15. The sensors 10 and the primary transceiver 15 are designed to be mounted to, and be integral with, the monitored component. It is preferred that the primary transceiver 15 have a unique electronic serial number by which a specific primary transceiver can be identified and correlated to a specific monitored component 5. Through the logging of this electronic serial number with the monitoring network, a historical database can be created for the monitored component 5 which can later be used for various statistical purposes such as the number of operating hours of a monitored component 5 or the gradual increase in operating temperature of a monitored component 5. The primary transceiver 15 has a face 25 and is positioned within the monitored component such that the primary transceiver face 25 is directed toward the location of a secondary transceiver 30. While FIG. 1 depicts an arrangement of three pairs of transceivers, the present invention also resides in a system having either one pair of transceivers or any number of pairs of transceivers.

The secondary transceiver 30 is installed in a secondary transceiver mounting 35 and has a secondary transceiver face 40 that is generally parallel and generally aligned with the primary transceiver face 25 of the primary transceiver 15. Misalignments of ±1.50 inches of vertical misalignment and ±0.75 inch of horizontal misalignment between the face of the primary transceiver 25 and the face of the secondary transceiver 30 are acceptable. Between the primary transceiver face 25 and the secondary transceiver face 40 is an air gap of a maximum of about 0.25 inches to ensure proper communications and energy transfer between the primary transceiver 15 and the secondary transceiver 30. In the preferred embodiment, the air gap is about 0.015 inches. All data communications and energy transfer between the primary transceiver 15 and the secondary transceiver 30 take place without the use of any electrical connectors or electrical cables. Therefore, the replacement of the monitored component 5, with the primary transceiver 15 and the sensors 10 integrated into the monitored component 5, is quicker and there is no danger of damage or contamination of electrical connectors or electrical cables from exposure of those parts to harsh environments.

The secondary transceiver 30 obtains its primary power by means of a power cable 45 attached to the secondary transceiver 30. The power cable 45 is then connected to an adequate power supply, through either a series or parallel connection with any other secondary transceivers, and finally to a power supply. Data is communicated between the secondary transceiver 30 and a monitoring network 50 by means of a data communication cable 55 having one end attached to the secondary transceiver 30 and the other end either attached directly to the monitoring network 50, or attached to the monitoring network 50 by either a series or parallel connection with any other secondary transceivers 30. The monitoring network 50 may be any type of electronic computing system including, for example, either a personal computer system, a work station computer system, or any other form of microprocessor-based computer system which is capable of accepting signals from the primary transceiver 15 or the secondary transceiver 30, and which is capable of storing and maintaining a database.

Figure 2:
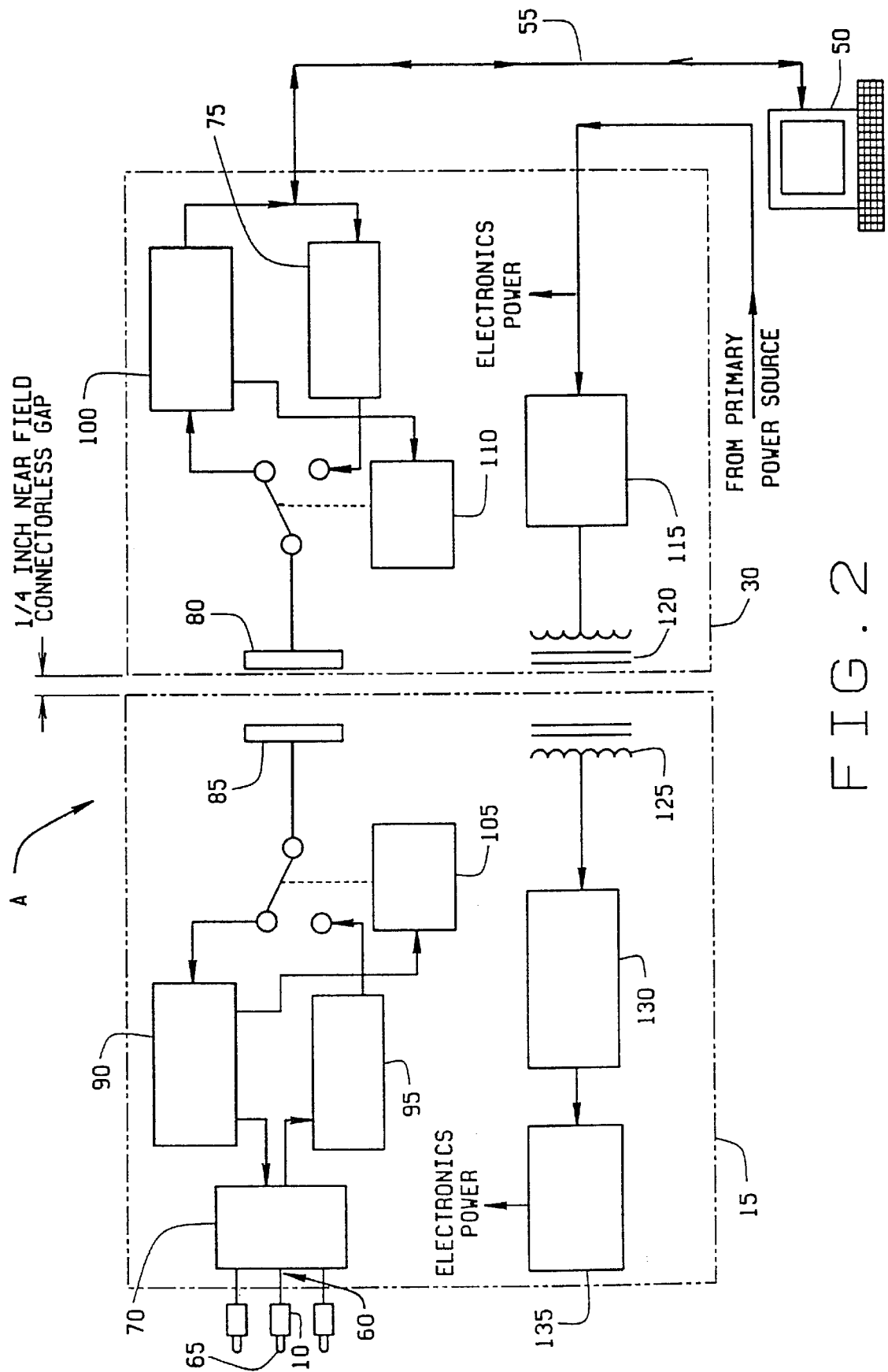
FIG. 2 is an block diagram schematic showing the internal functions and interoperability of the connectorless transceivers.

The internal functions and interoperation of the primary transceiver 15 and the secondary transceiver 30 are shown in the electrical schematic of FIG. 2. As depicted in FIG. 2, the monitoring and controlling system A includes at least one temperature sensor 10 and one primary transceiver 15 which has at least one sensor connection 60 in the primary transceiver 15. The sensor 10 is connected to the primary transceiver 15 at the sensor connector 60. The sensor 10 has a probe 65 which is positioned as needed to properly obtain the required operating characteristic of the monitored component 5.

The primary transceiver 15 contains a number of internal components including a monitor 70, a primary transceiver receiver 90, a primary transceiver transmitter 95, a primary transceiver transmit/receive control switch 105, a capacitor plate 85, regulator 135, a rectifier and filter 130, and a secondary inductance coil 125. Similarly, the secondary transceiver 30 also contains a number of internal components including a secondary transmitter 75, a secondary transceiver receiver 100, a secondary transceiver transmit/receive control switch 110, an oscillator 115, a primary inductance coil 120, and a capacitor plate 80.

The sensor connection 60 receives data from the sensor 10 and communicates the sensor data to the primary transceiver monitor 70. The primary transceiver monitor 70 receives communications from the monitoring network 50 to transmit the data obtained by the sensor 10 after the monitoring network 50 transmits its commands through the data communications cable 55, the secondary transceiver transmitter 75, the secondary transceiver capacitor plate 80, the primary transceiver capacitor plate 85, and the primary transceiver receiver 90. Data collected from the sensor 10 is then transferred to the monitoring network 50 by routing that data through the primary transceiver monitor 70, the primary transceiver transmitter 95, the primary transceiver capacitor plate 85, the secondary transceiver capacitor plate 80, the secondary transceiver receiver 100, and the data communications cable 55. The monitoring system 50 controls the flow of sensor data communication by activating or deactivating the primary transceiver transmit/receive control switch 105 and the secondary transceiver transmit/receive switch 110. Such data flow control is necessary to prevent data flow interference in the overall monitoring and controlling system A. Thus, while the sensor 10 may be accumulating data for transmittal to the monitoring network 50, signals sent from the monitoring network to the primary transceiver 15 and the secondary transceiver 30 determine whether the transmit/control switches 105 and 110 are configured to allow the sensor data to enter the monitoring network data communication cable 55. The monitoring network 50 utilizes an RS 485 Multidrop network system to configure and control the flow of data communication in the monitoring and controlling system A.

Together, the primary transceiver 15 and the secondary transceiver 30 create a connectorless data transmission system. In this system, no connectors or conductors are used to connect the primary transceiver 15 to the secondary transceiver 30. The maintenance characteristics of the monitored component 5 are thereby enhanced because the entire monitored component 5 may be removed and replaced without the need for disconnecting and reconnecting fragile cable assemblies.

Input electrical power is supplied to the secondary transceiver 30 by means of an electrical cable 45 (FIG. 1) attached to the secondary transceiver 30. Power is supplied to the primary transceiver 15 by means of a contactless electrical transfer system. The contactless electrical transfer system transmits power by relying on the electrical principles used in the design and operation of electrical transformers. A simple transformer has at least one primary winding and at least one secondary winding. Normally, the primary and secondary windings are wound around a single magnetic structure or core resulting in the conversion of electrical power from one voltage to another. When the primary and secondary windings of the transformer are wound on separate magnetic structures or cores, and the two magnetic structures are placed within close proximity to each other, the primary winding is inductively coupled with the secondary winding without any physical connections between the magnetic structures and electrical energy is transferred from the primary to the secondary winding.

This connectorless energy coupling occurs when application of power to the primary winding creates a magnetic flux of some density between the magnetic structure of the primary winding and the magnetic structure of the secondary winding, thereby inducing a current flow in the secondary winding. Because the amount of electrical energy created within the secondary winding is directly related to the density of the magnetic flux created by the current flow in the primary winding, the physical distance between the primary and secondary magnetic structures determines the density of the magnetic flux and subsequently the current flowing in the secondary winding. Thus, the physical gap between the primary and secondary structures controls the amount electrical energy inductively transmitted to the secondary winding.

In the present invention, the power applied to the secondary transceiver 30 is converted to high frequency alternating current of about 30 kHz by the secondary oscillator 115. That electrical power is then routed through the primary inductance coil 120 in the secondary transceiver 30. When the secondary transceiver 30 and the primary transceiver 15 are positioned a maximum of about 0.25 inches apart, and the primary inductance coil 120 is generally aligned with the secondary inductance coil 125, the 120 volt alternating current power flowing within the primary inductance coil 120 induces a current flow in the secondary inductance coil 125. The current flow in the secondary inductance coil 125 is converted by the rectifier/filter 130 and then routed through the regulator 135 to create 12 Volts direct current at 500 mA to power the electronics of the primary transceiver 15. This 12 Volts direct current power is then used by the primary transceiver 15 to gather data from the sensors 10, or any other sensing devices connected to the primary transceiver 15, and then to transmit that data to the secondary transceiver 30 for subsequent input into the monitoring network 50.

The primary transceiver 15 and the secondary transceiver 30 communicate through a pair of coupled capacitor plates. The primary transceiver transmitter 95 applies a modulated voltage to the primary transceiver capacitor plate 85. The modulated voltage utilizes standard radio frequencies. The application of this modulated voltage to the primary transceiver capacitor plate 85 generates a modulating electric field on the secondary transceiver capacitor plate 80. This modulating electrical field is then converted to a data signal, and this data signal is communicated to the monitoring system 50 by the secondary transceiver receiver 100 and the data communication cable 55. The transmission rate is about 2400 baud in an RS-485 half duplex format. Communication from the secondary transceiver 30 to the primary transceiver 15 uses this same process.

Because at least one of the sensors 10 is a temperature sensor, the temperature sensor provides a means of bearing temperature monitoring in applications where the monitored component is a bearing. By monitoring the changes and rate of changes within a bearing's operating temperatures, it can be determined whether the bearing is operating properly. The present invention assesses whether the bearing is operating properly by comparing the operating temperature of the bearing with a predicted operating end temperature.

Figure 3:
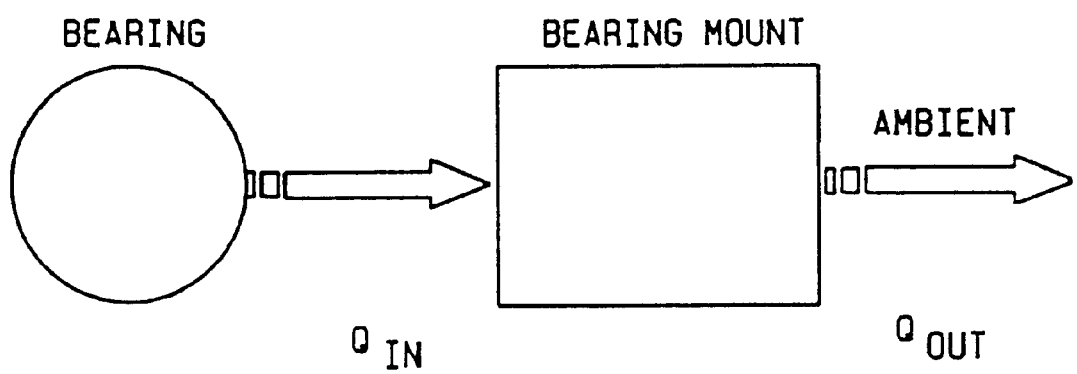
FIG. 3 depicts the flow of heat from a monitored component as anticipated by the process of predicted end temperature monitoring.
Figure 4:
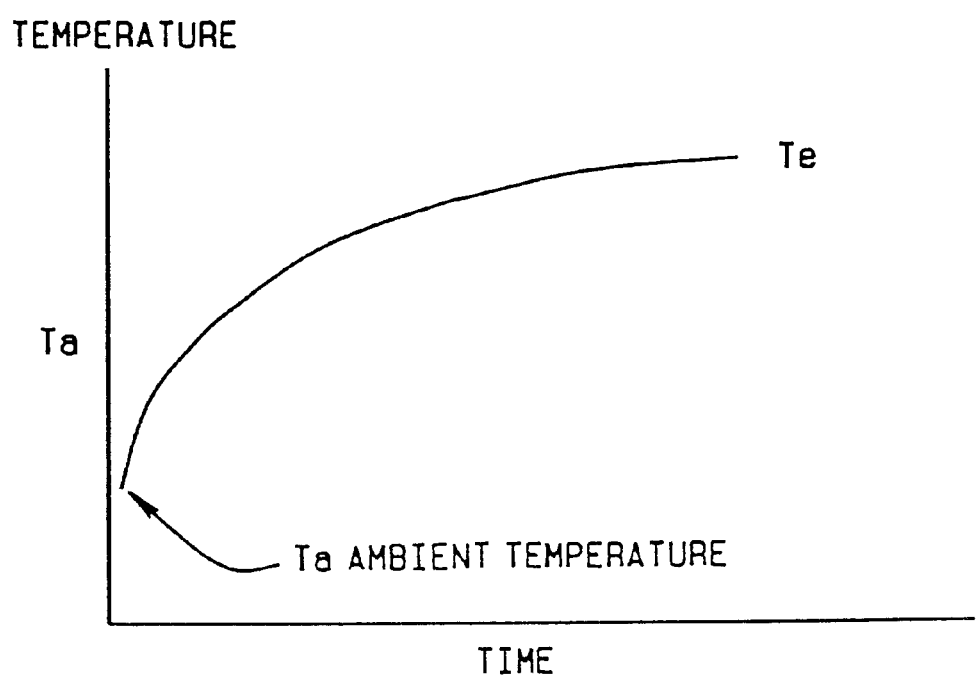
FIG. 4 shows the relationship between the temperature of the monitored component and the mounting for the monitored component.

Examining the predicted end temperature of the bearing provides a simple, but accurate, model of the heat flow around a bearing. The diagram in FIG. 3 depicts the flow of heat between the bearing 140, the bearing mount 145 and the ambient temperature surrounding the bearing mount. The bearing 140 is the heat source, Qin, and is surrounded by the metallic material making up the bearing mount 145. The bearing mount metallic material has a finite specific heat depending on the material used in manufacturing the bearing mount 145. Through conduction and convection, Qin flows through the metallic material toward the ambient temperature until Qin becomes Qout. The flow of Qout is governed by a lumped transfer parameter. The specific heat of the metallic material of the bearing mount 145 and the lumped transfer parameter are reasonably constant. For a constant heat input from the bearing 140, the temperature of the bearing 140 and the bearing mount 145 will follow the characteristics indicted in the graph of FIG. 4. Mathematically, the relationship between the current temperature indicated by the temperature sensors 10, the ambient temperature, and the ending temperature is:

$$T = Ta + Trise\left(1 - e^{-\frac{t}{\tau}}\right)$$

Where:
- T=current temperature indicated by the temperature sensors
- Ta=ambient temperature
- Trise=the ending temperature Te less the ambient temperature Ta
- τ=the time constant of the system specific to the specific heat and the lumped heat transfer coefficient.

The slope of the temperature line is determined by taking the derivative as follows:

$$\frac{dT}{dt} = \frac{Trise}{\tau} e^{-\frac{t}{\tau}}$$

Combining the two previous equations results in the following equation for calculating the ending temperature Te from the current temperature T and slope of the temperature variant curve $$\frac{dT}{dt}:$$

$$Te = T + \frac{dT}{dt}\tau$$

When the current temperature level and slope predict an abnormal end temperature, then the monitoring system 50 alerts the machine operator.

This method of predicting improper operation of the monitored component 5 by comparing current temperatures to predicted end temperatures must also include some from of ambient temperature compensation. Because the temperature rise over the ambient temperature is indicative of the heat input from the monitored component 5, it is advantageous to adjust the temperature limits when the ambient temperature is different than the ambient temperature under standard operating conditions. Otherwise, as the ambient temperature rises, the predetermined temperature limits will be too low thus causing false indications of improper operating conditions for monitored component 5. Conversely, the predetermined temperature limits become too high when the ambient temperature is lower than the standard operating temperature thus allowing the monitored component 5 to operate while in detrimental operating conditions without indications that such an abnormal condition exists.

While the present invention provides connectorless monitoring capability, it is understood that the transceiving aspect of the primary and secondary transceivers also provides a method by which a signal sent from the monitoring network could also be used to instruct the transceivers to signal the activation of an auxiliary component, such as another device to perform a function other than monitoring. As an example of this embodiment, the monitoring and controlling system could determine from the information provided by the sensors that the monitored component was operating at a deficient level of lubrication. In response to such a determination, the monitoring network could signal the primary transceiver to generate an output signal capable of operating a solenoid valve which would open to allow the entry of lubricating fluids to the monitored device. The auxiliary component may be any other device that receives a signal from the monitoring network which instructs the auxiliary device to perform any function related in any way to the monitored component.

Figure 5:
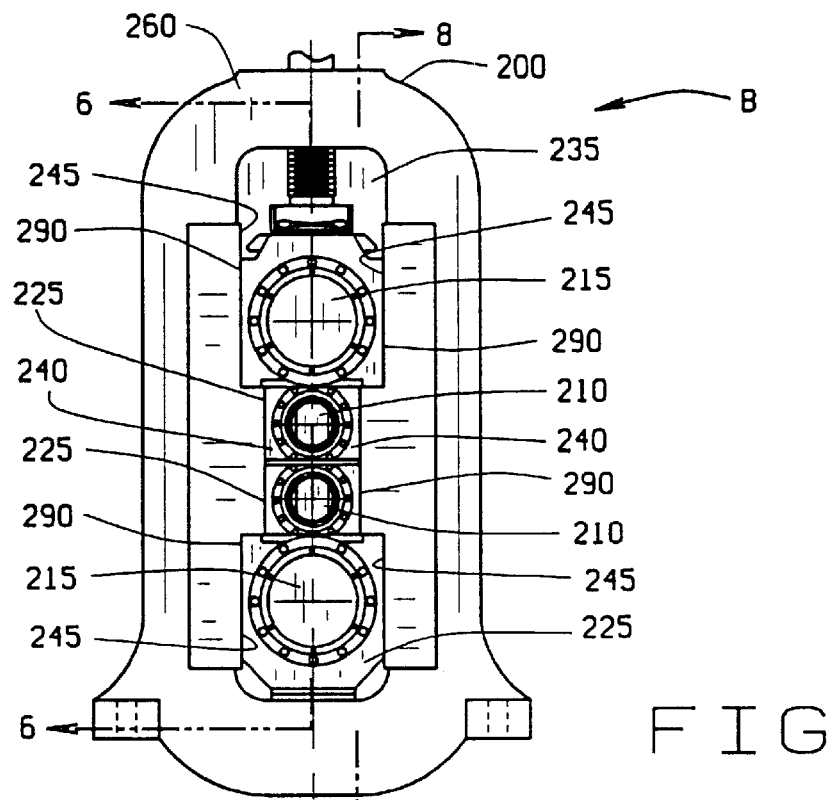
FIG. 5 is an end view of a millstand provided with a monitoring and controlling system constructed in accordance with one embodiment of the present invention.
Figure 6:
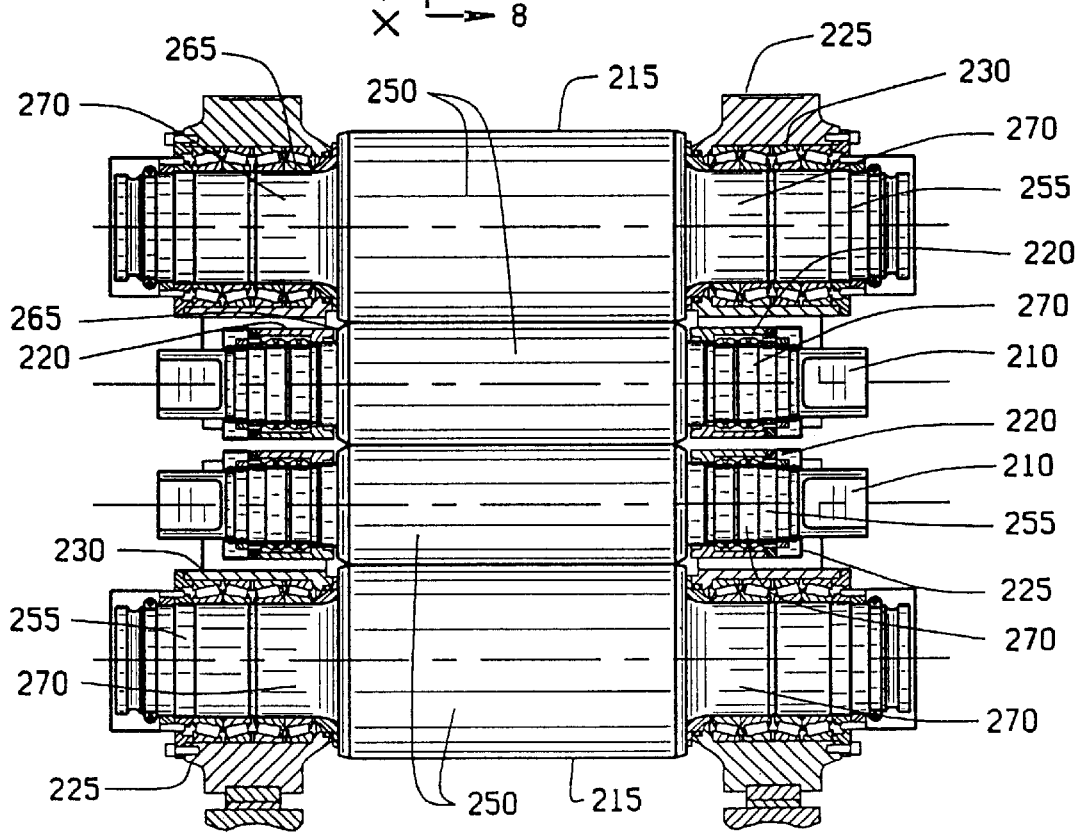
FIG. 6 is a sectional view of the millstand showing the relationship between the backing rolls, the work rolls, and the antifriction bearings.

In one embodiment of the present invention, a monitoring system 50 is used in a millstand B wherein the monitored component 5 is a roll neck bearing. FIG. 5 and FIG. 6 depict a monitoring and controlling system in a millstand B in which a shape, made from steel or some other metal, is rolled to transform its cross-sectional size and configuration. The millstand B includes spaced apart housings 200 which support a pair of work rolls 210 and also a pair of backing rolls 215, there being a separate backing roll 215 behind each work roll 210. The metal shape passes between the work rolls 210 which reduce its cross-sectional size. The backing rolls 215, on the other hand, prevent the work rolls 210 from deflecting under the substantial forces exerted by the metal shape as it passes between the work rolls 210. The rolls 210 and 215 rotate about their axes X on an antifriction bearing 220 that are contained within a chock 225 which are in turn fitted to the housings 200.

The antifriction bearing 220 transfers spreading forces from the rolls 210 and 215 to the chocks 225 and thence to the frame 200 and in so doing, the antifriction bearing 220 experiences severe shocks from time to time. Moreover, the metal shapes as they pass between the work rolls 210 discharge considerable dirt and grime and often those shapes are cooled with a water spray. Sometimes these contaminants migrate into the antifriction bearings 220. Frequently, the rolls 210 and 215 are removed from the frame 200 along with the antifriction bearings 220 and chocks 225, and occasionally the bearings 220 are replaced with reconditioned or new bearings. The millstand A has a monitoring and controlling system C for monitoring the condition of the antifriction bearings 220 for its rolls 210 and 215 to determine when any antifriction bearing 220 requires replacement. The monitoring and controlling system C may also monitor an antifriction bearing 230 for the backing rolls 215.

More specifically, the housings 200 constitute massive steel castings, each having a window 235 into which the chocks 225 at the ends of the rolls 210 and 215 fit. Each window 235 is lined with a set of central parallel side faces 240 between which the chocks 225 for the bearings 220 of the work rolls 210 fit and more end parallel side faces 245 which are spread farther apart to accommodate the larger chocks 225 of the backing rolls 215.

Each roll 210 and 215 has a body 250 that is located between the two end members 260 of the housings 200 and at each end of the body 250 and a roll neck 255. The bodies 250 for the work rolls 210 actually contact the metal shape that is worked in the millstand A, whereas the bodies 250 of the backing rolls 215 bear and roll against the bodies 250 of the work rolls 210 to prevent the work rolls 210 from deflecting. Each roll neck 255 merges into the body 250 of its roll 210 or 215 at a fillet 265. Each roll neck 255 also has a bearing seat 270 over which the antifriction bearing 220 and 230 for the roll necks 255 fit.

Figure 7:
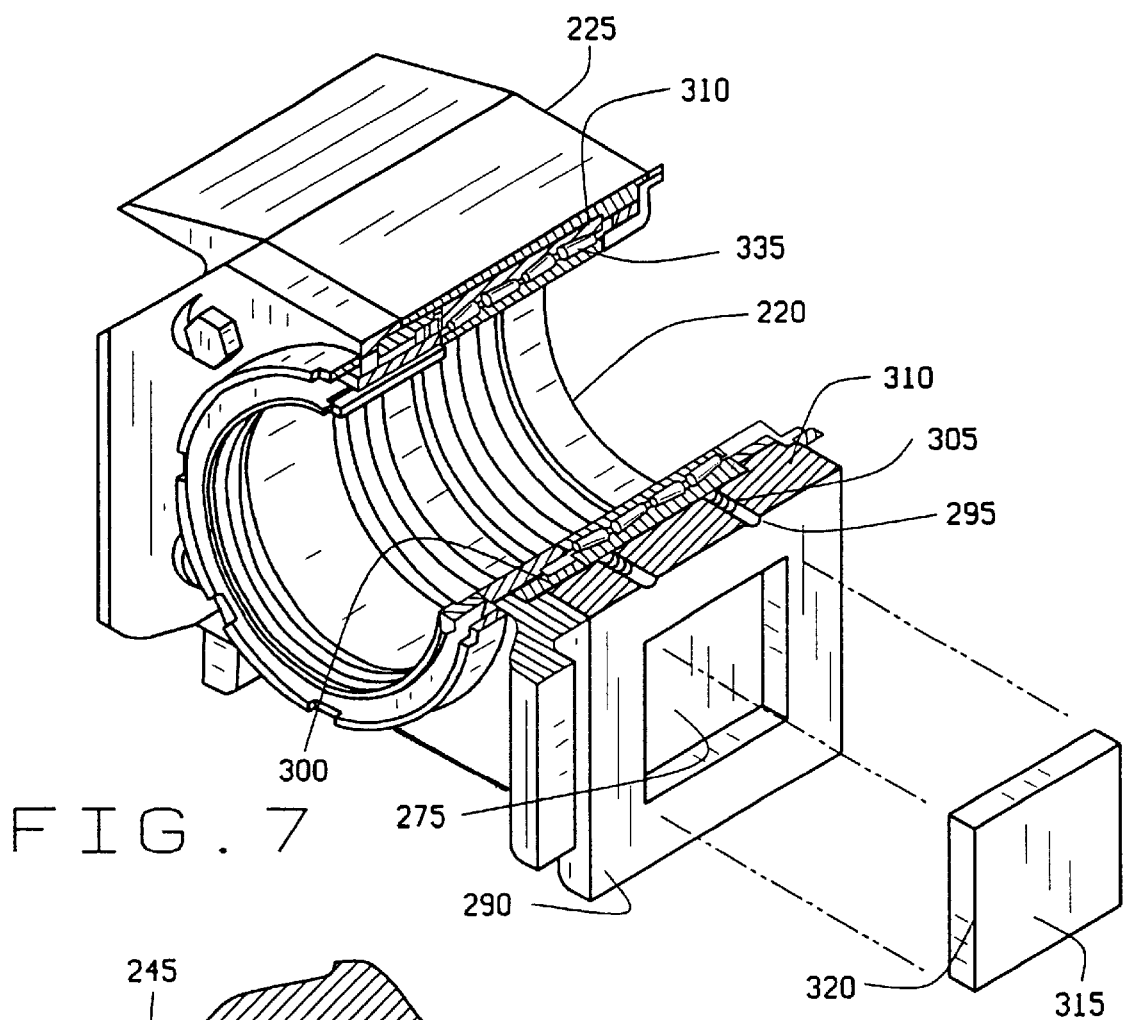
FIG. 7 is a perspective view, partially broken away and in section, of a millstand chock containing a chock transceiver forming part of the monitoring and controlling system.

Each chock 225 (FIG. 7) that confines the antifriction bearing 220 for one of the two work rolls 210 contains a chock recess 275 that opens out of one of its side faces 290. The same chock 225 has sensor mounting bores 295 which extend radially and at their inner ends open into the main bore 300 in which the bearing 220 is received.

Figure 8:
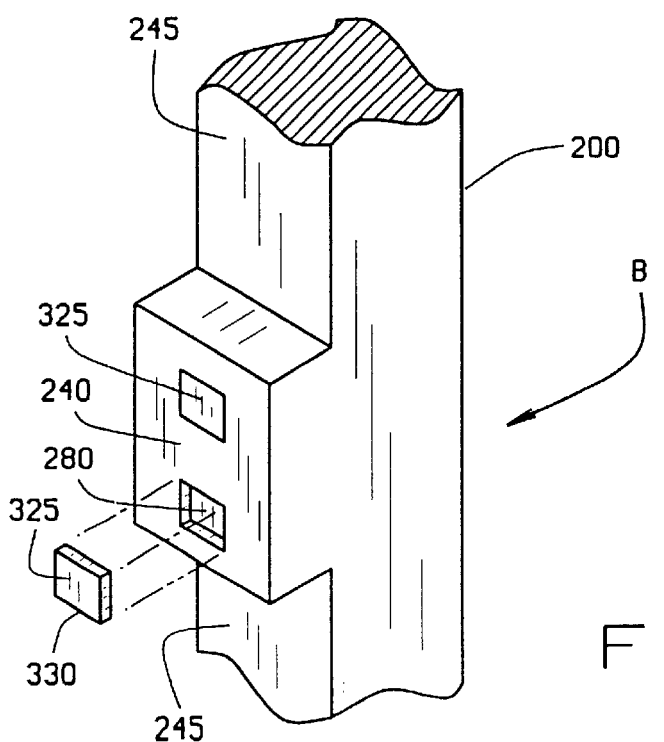
FIG. 8 is a fragmentary sectional view of a millstand housing containing millstand transceivers forming part of the monitoring and controlling system.

The housing 200 (FIG. 8) in which the chock 225 is received also has a housing recess 280 which opens out of one of its side faces 240—indeed, the same side face 240 toward which the chock recess 275 (FIG. 7) in the chock 225 opens. Chock recess 275 and housing recess 280, while not necessarily being in marginal registration, generally align.

The monitoring and controlling system C for the millstand B embodiment of the present invention operates in a manner essentially the same as the previously described embodiment. Thus, the millstand embodiment includes a set of temperature sensors 305 which occupy a set of sensor mounting connections 295, there being a different sensor 305 secured in each sensor mounting connection 295. The temperature sensors 305 bear against the cylindrical outside surfaces of a bearing cup 310. The sensor mounting connections 295 are organized such that each cup 310 of the bearing 220 has at least one temperature sensing probe 305 against it. In addition, the monitoring and controlling system B has a primary transceiver in the form of a chock transceiver 315 located in the chock recess 275 of the chock 225. The chock transceiver 315 has a sealed case 320 which lies flush with the side face 290 out of which its chock recess 275 opens or is set slightly back from it.

A secondary transceiver in the form of a millstand transceiver 325 (FIG. 8) is located in the housing recess 280 of the housing 200. The millstand transceiver 325 has a sealed case 330 which lies flush with the side face 240 out of which its housing recess 280 opens or else is set back slightly from it.

Together, the chock transceiver 315 and the millstand transceiver 325 again create a connectorless data transmission system where no connectors or conductors are used to connect the chock transceiver 315 and to the millstand transceiver 325. Also similar to the previous embodiment, the input electrical power is supplied to the chock transceiver 315 by means of an electrical cable attached to the millstand transceiver 325 and power is supplied to the chock transceiver 315 by means of a contactless electrical transfer system. The maintenance characteristics of the millstand A are thereby enhanced because the chock 225 and the work roll 210 may be removed and replaced without the need for the disconnecting and reconnecting of fragile electrical cable assemblies in the hostile environment of the rolling mill.

As in the previous embodiment, the temperature sensors 305 provide a means of bearing temperature monitoring by monitoring the changes and rate of changes within a bearing's operating temperatures and applying the predicted operating end temperature equations previously described.

The chocks 225 (FIG. 6) for the bearings 220 of the work rolls 210 may also contain accelerometers to detect excessive vibrations in those chocks 225. Should one of the rolling elements 335 (FIG. 7) of the antifriction bearing 220 disintegrate, the antifriction bearing 220 will produce vibrations which the accelerometer will detect, particularly during the intervals between passes of the shape through the work rollers 220. The accelerometer produces a signal representative of the magnitude of the vibrations. The accelerometer is connected to the chock transceiver 315 which converts the signal to a radio frequency signal. The millstand transceiver 325 captures the signal and directs it onward for further processing.

The chocks 225 for the antifriction bearing 220 of the backing rolls 215 may be fitted with a chock transceiver 315 and the housings 200 at their side faces 245 (FIG. 8) fitted with millstand transceivers 325 in a like manner. In some millstands the chocks 225 for the antifriction bearing 220 of the work rolls 210 may be located in the chocks 225 for the antifriction bearing 220 of the backing rolls 215. In that arrangement, the millstand transceivers 325 for the antifriction bearing 220 of the work rolls 210 are located in the chocks 225 for the bearing 220 of the backing rolls 215 so the latter chocks 225 in effect become housings.

In yet another embodiment of the present invention, a monitoring system 50 is used in a millstand C. Millstand C differs from millstand B in the previous embodiment in that the general configuration of the millstand frame and side faces in millstand C (similar to items 200 and 290 respectively of millstand B in the previous embodiment) are such that the monitoring system 50 must communicate across two gaps for each monitored bearing, instead of just one gap as shown in the previous embodiment.

Figure 9:
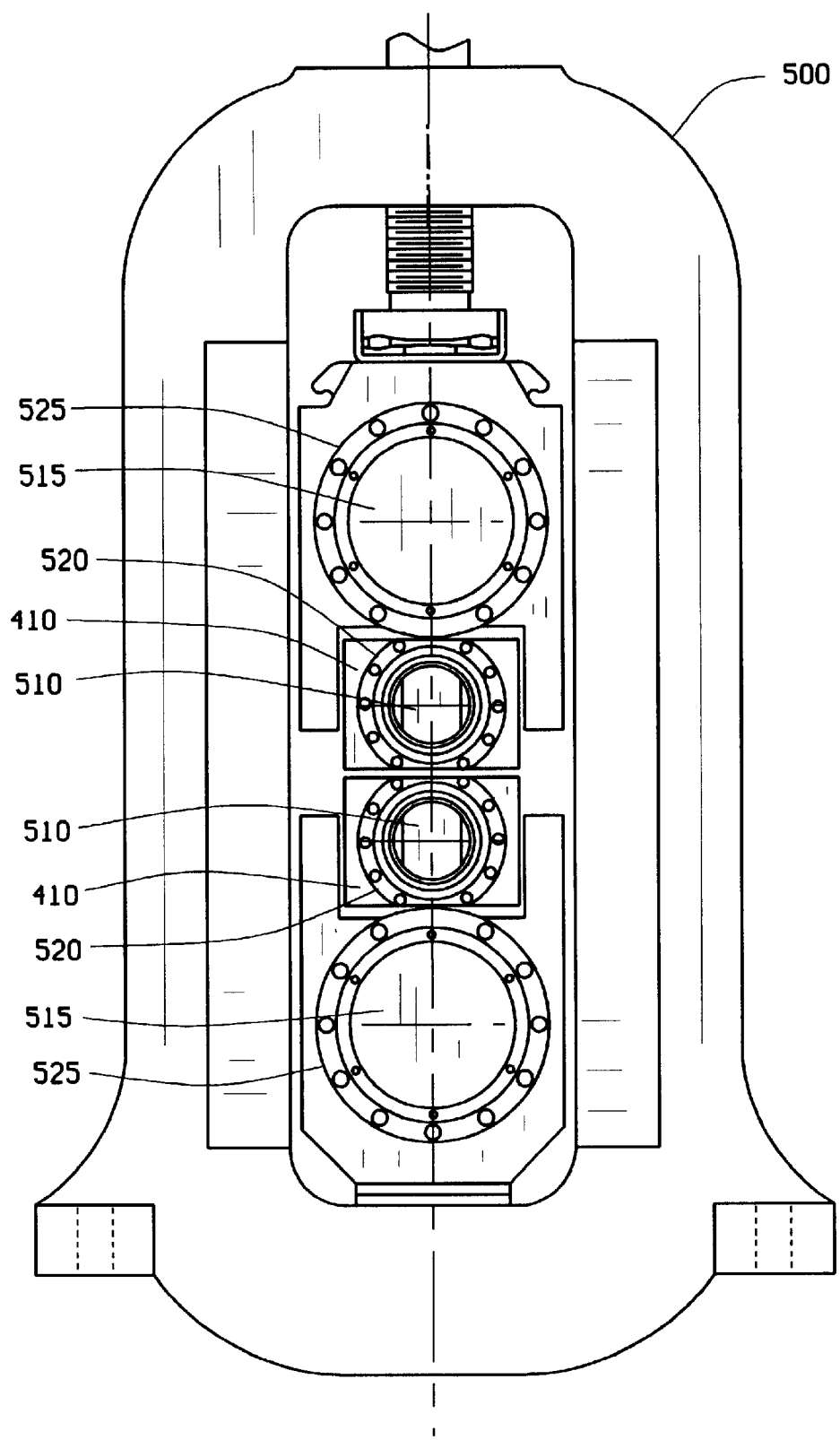
FIG. 9 is an end view of a millstand provided with a monitoring and controlling system in accordance with another embodiment of the invention wherein the chock transceiver and the millstand transceiver cannot be positioned near each other.

Referring now to FIG. 9, a monitoring system 50 is used in a millstand C wherein the monitored component 5 is a roll neck bearing. The general construction and operation of millstand C is similar to millstand B. The millstand C includes spaced apart housings 500 which support a pair of work rolls 510 and also a pair of backing rolls 515, there being a separate backing roll 515 behind each work roll 510. The metal shape passes between the work rolls 210 which reduce its cross-sectional size. The backing rolls 515, on the other hand, prevent the work rolls 510 from deflecting under the substantial forces exerted by the metal shape as it passes between the work rolls 510. The rolls 510 and 515 rotate about their axes X on an antifriction bearing 520 that are contained within a chock 410 which are in turn fitted to the housings 500.

As in the millstand B embodiment, the antifriction bearing 520 transfers spreading forces from the rolls 510 and 515 to the chocks 410 and thence to the frame 500, and in so doing the antifriction bearings 520 experience severe shocks from time to time. Moreover, as in millstand B, the rolls 510 and 515 are occasionally removed from the frame 500 for repair or replacement.

Like the millstand B, the millstand C has a monitoring and controlling system C for monitoring the condition of the antifriction bearings 520 for its rolls 510 and 515 to determine when any antifriction bearing 520 requires replacement. The monitoring and controlling system C may also monitor an antifriction bearing 525 for the backing rolls 515. The monitoring system C includes sensors for use in monitoring the operation of the antifriction bearing 520 or 525 and may include, as examples, sensors for temperature, vibration, or stress.

Figure 10:
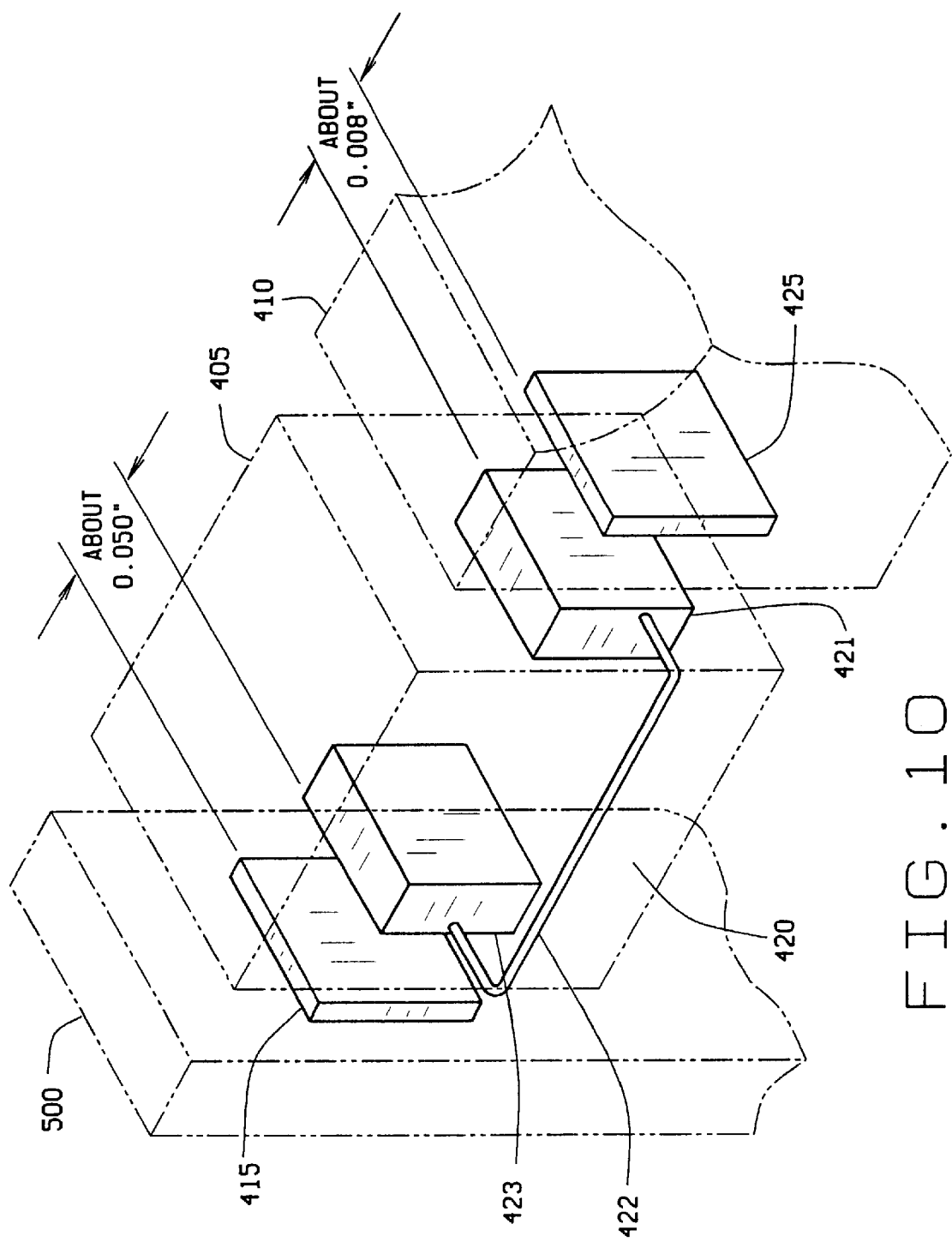
FIG. 10 is perspective view showing the relationship between the chock transceiver, the pass through enclosure, and the millstand transceiver.

In FIG. 10, the cross section of the millstand C at the roll neck bearings 520 shows the placement and configuration of the connectorless communication and power mechanisms. Specifically, a millstand transceiver 415 is imbedded into the millstand frame 500 and a chock transceiver 425 is imbedded into a chock 410. A pass through enclosure 420 is imbedded within the back up roll chock 405 such that the pass through enclosure 420 is located between, and is in general alignment with, the millstand transceiver 415 and the chock transceiver 425. There is an air gap of about 0.050 inches between the face of the millstand transceiver 415 and the face of the pass through enclosure 420, and an air gap of about 0.008 inches between the opposite face of the pass through enclosure 420 and the face of the chock transceiver 425. These dimensions are kept to ensure proper communications and energy transfer between the millstand transceiver 415, the pass through enclosure 420, and the chock transceiver 425.

The pass through enclosure 420 contains a millstand transceiver interface 423, a chock transceiver interface 421 and an interconnecting cable 422. The interconnecting cable 422 provides a means of communication between the millstand transceiver interface 423 and the chock transceiver interface 421, and also provides electrical power from the chock transceiver interface 421 to the millstand transceiver interface 423.

Figure 11:
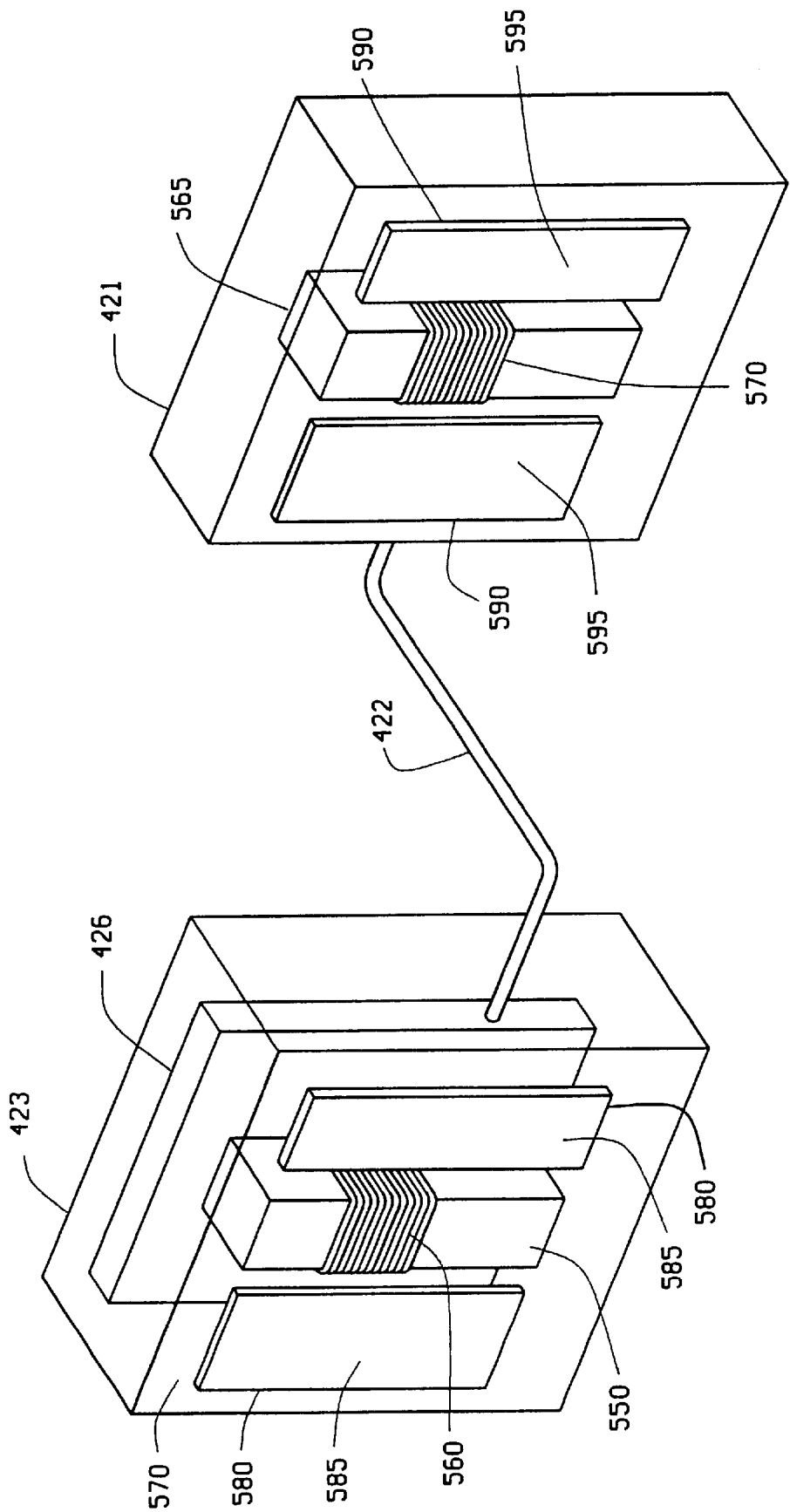
FIG. 11 is a perspective view showing the internal components of the pass through enclosure.

As shown in FIG. 11, the pass through enclosure 420 is generally a hollow cube or a two part box. One end of the pass through enclosure 420 holds the millstand transceiver interface 423 and the other end of the pass through enclosure contains the chock transceiver interface 421. The remainder of the interior cavity of the pass through enclosure 420 is filled with a material that allows effective capacitive coupling between the chock transceiver 425 and the millstand transceiver 415.

The millstand transceiver interface 423 has two capacitor plates 580, a ferrite core 550, and a computer board 426. Each capacitor plate 580 has an outer surface 585. The capacitor plates 580 are imbedded into first outer surface 570 of the pass through enclosure 420 such that the outer plate surfaces 585 are parallel and flush with the first outer surface 570. The ferrite core 550 has a number of wire windings 560 wrapped around the longitudinal length of the ferrite core. The computer board 426 provides an electronic repeater device capable of regenerating and transferring communications and power through the interconnecting cable 422.

The chock transceiver interface 421 has two capacitor plates 590 and a ferrite core 565. Each capacitor plate 590 has an outer surface 595. The capacitor plates 590 are imbedded into second outer surface 575 of the pass through enclosure 420 such that the outer plate surfaces 595 are parallel and flush with the first outer surface 575. The ferrite core 565 has a number of wire windings 561 wrapped around the longitudinal length of the ferrite core.

When positioned between the millstand transceiver 415 and the chock transceiver 425, the capacitor plates 580 and 590 of the pass through enclosure 420 are in general alignment with the capacitor plates 80 and 85 of the transceivers.

Together, the millstand transceiver 415 (FIG. 10), the pass through enclosure 420, and the chock transceiver 425 create a connectorless data transmission system where no connectors or conductors are used to interconnect the millstand transceiver 415, the pass through 420, and the chock transceiver 425. As in the previous embodiments, the input electrical power is supplied to the chock transceiver 425 by means of an electrical cable attached to the millstand transceiver 415 and power is supplied to the chock transceiver 415 by means of a contactless electrical transfer system. The maintenance characteristics of the millstand A are thereby enhanced because the chock 410 and the work roll 515 (FIG. 9) may be removed and replaced without the need for the disconnecting and reconnecting of fragile cable assemblies in the hostile environment of the rolling mill.

As in the previous embodiment, the temperature sensors 305 provide a means of bearing temperature monitoring by monitoring the changes and rate of changes within a bearing's operating temperatures and applying the predicted operating end temperature equations previously described.

The chocks 410 for the antifriction bearing 525 of the backing rolls 515 may also be fitted with a chock transceiver, pass through enclosure, and a millstand transceiver in a like manner.

While the above description describes millstand embodiments of the monitoring and controlling system of the present invention, it will be clear that the present invention may be otherwise easily adapted to fit any configuration where a monitoring and controlling system with connectorless data transmission and connectorless energy transfer may be utilized.

PART LIST
MONITORING AND CONTROLLING SYSTEM
WITH CONNECTORLESS QUICK-CHANGE COMPONENTS

| | |
|---|---|
| A | monitoring and controlling system |
| B | monitoring and controlling system for a millstand embodiment |
| C | monitoring and controlling system for a millstand embodiment |
| 5. | monitored component |
| 10. | sensor |
| 15. | primary transceiver |
| 20. | sensor conductor |
| 25. | primary transceiver face |
| 30. | secondary transceiver |
| 35. | secondary transceiver mounting |
| 40. | secondary transceiver face |
| 45. | power cable |
| 50. | monitoring network |
| 55. | data communications cable |
| 60. | sensor connection |
| 65. | sensor tip |
| 70. | primary transceiver monitor |
| 75. | secondary transceiver transmitter |
| 80. | secondary transmitter capacitor plate |
| 85. | primary transmitter capacitor plate |
| 90. | primary transceiver receiver |
| 95. | primary transceiver transmitter |
| 100. | secondary transceiver receiver |
| 105. | primary transceiver transmit/control switch |
| 110. | secondary transceiver transmit/control switch |
| 115. | oscillator |
| 120. | primary inductance coil |
| 125. | secondary inductance coil |
| 130. | rectifier/filter |
| 135. | regulator |
| 140. | bearing |
| 145. | bearing mount |
| 200. | housing |
| 210. | work rolls |
| 215. | backing rolls |
| 220. | work roll antifriction bearing |
| 225. | chocks |
| 230. | backing roll antifriction bearing |
| 235. | window |
| 240. | central parallel side face |
| 245. | end parallel side faces |
| 250. | body |
| 255. | roll neck |
| 260. | end members |
| 265. | fillet |
| 270. | bearing seat |
| 275. | chock bearing |
| 280. | housing recess |

-continued

PART LIST
MONITORING AND CONTROLLING SYSTEM
WITH CONNECTORLESS QUICK-CHANGE COMPONENTS

| | |
|---|---|
| 290. | side face |
| 295. | sensor mounting connection |
| 300. | main bore |
| 305. | temperature sensor |
| 310. | bearing cup |
| 315. | chock transceiver |
| 320. | sealed case |
| 325. | millstand transceiver |
| 330. | sealed case |
| 335. | rolling elements |
| 410 | chocks |
| 415 | millstand transceiver |
| 420 | pass through enclosure |
| 421 | chock transceiver interface |
| 422 | interconnecting cable |
| 423 | millstand transceiver interface |
| 425 | chock transceiver |
| 426 | computer board |
| 500 | housing |
| 510 | work rolls |
| 515 | backing rolls |
| 520 | antifriction bearing for work rolls |
| 525 | antifriction bearing for backing rolls |
| 550 | ferrite core |
| 560 | wire windings |
| 561 | wire windings |
| 565 | ferrite cores |
| 570 | first outer surface |
| 575 | second outer surface |
| 580 | capacitor plates |
| 585 | outer surface |
| 590 | capacitor plates |
| 595 | outer surface |

What is claimed is:

1. A millstand for rolling metal shapes, said millstand comprising:
a housing having a window lined with side faces;
a chock located within the window and having side faces presented toward the side faces on the housing;
a roll supported on the housing and having a body and a roll neck at the end of the body, with the roll neck extending into the chock;
an antifriction bearing located between the roll neck and the chock for enabling the roll to rotate relative to the chock and the housing, the antifriction bearing including an outer race fitted into the chock, an inner race fitted around the roll neck, and rolling elements located between the inner and outer races;
at least one sensor carried by the chock for sensing an operating condition of the antifriction bearing;
a chock transceiver carried by the chock capable of producing radio frequency signals that reflect conditions detected by the at least one sensor, and also capable of receiving radio frequency signals; and
a millstand transceiver positioned adjacent to the chock and being capable of transmitting radio signals to the chock transceiver and receiving radio frequency signals produced by the chock transceiver.

2. A millstand according to claim 1 and further comprising inductively transferring electrical energy from the millstand transceiver to the chock transceiver and using the electrical energy so transferred to produce the radio frequency signal.

3. A millstand according to claim 1 wherein the chock transceiver is electronically identified by a unique serial number.

4. A millstand according to claim 2 wherein the unique serial number is used to compile historical operating and maintenance data for the chock electronically identified by the unique serial number.

5. A millstand according to claim 1 wherein the at least one sensor detects the temperature of the antifriction bearing.

6. A millstand according to claim 5 wherein the at least one sensor detects the temperature of the outer race of the antifriction bearing.

7. A millstand according to claim 1 wherein the millstand transceiver is carried by the housing.

8. A millstand according to claim 7 wherein the chock contains a recess which opens out of one of its side faces, and the chock transceiver is in the recess; and wherein the housing contains a recess in one of the side faces that line its window, with the recess in the housing opening toward the recess in the chock; and wherein the chock transceiver is in the recess in the housing.

9. A millstand according to claim 7 or 8 wherein the chock transceiver and the millstand transceiver are inductively coupled to transmit electrical energy from the millstand transceiver to the chock transceiver to operate the chock transceiver.

10. The millstand according to claim 1 wherein the millstand includes a monitoring network which instructs the primary transceiver to generate a control signal to control an auxiliary component used to perform a maintenance function related to the operation of the millstand.

11. The combination comprising:
a roll having a body and a neck at the end of the body; a chock receiving the neck;
an antifriction bearing located between the roll neck and the chock for enabling the roll to rotate relative to the chock, the bearing including an outer race fitted to the chock, an inner race fitted around the roll neck, and rolling elements located in at least one row between the inner and outer races;
a sensor carried by the chock and having the capacity to detect an operating condition of the antifriction bearing; and
a chock transceiver carried by the chock and being connected with the sensor, the chock transceiver being capable of producing and transmitting a radio frequency signal that reflects the operating condition of the antifriction bearing as detected by the sensor.

12. The combination according to claim 11 wherein the sensor detects the temperature of the outer race of the antifriction bearing.

13. The combination according to claim 12 wherein the sensor includes a probe which bears against the outwardly presented surface of the outer race for the antifriction bearing.

14. The combination according to claim 11 wherein the chock has a side face and a recess opening out of the side face, and the receiver is in the recess.

15. A process of monitoring and controlling the operation of a roll neck antifriction bearing that is fitted to a chock located in a housing of a millstand, said process comprising:
a. at the chock, sensing an operating characteristic of the roll neck antifriction bearing;
b. from within the chock, producing a radio frequency signal that reflects the operating characteristic of the roll neck antifriction bearing;
c. receiving the radio frequency signal at a location remote from chock;

d. using the radio frequency signal so received to assess a need for a maintenance task required for the roll neck antifriction bearing; and e. transmitting a signal to the roll neck bearing to control an auxiliary component to perform a control function related to the roll neck antifriction bearing.

16. The process according to claim 15 wherein the radio frequency signal is received at the housing of the millstand.

17. The process according to claim 15 or 16 and further comprising:

a. inductively transferring electrical energy from the housing to the chock; and b. using the electrical energy so transferred to produce the radio frequency signal.

18. The process according to claim 17, wherein said process further comprises:

a. transmitting a control signal from the remote location to the secondary transceiver;

b. receiving the control signal at the secondary transceiver;

c. transmitting the control signal from the secondary transceiver to the primary transceiver; and d. using the control signal received by the primary transceiver to control an auxiliary component to perform a control function related to the monitored component.

19. The process of claim 18, wherein the transmitting of the control signal from the secondary transceiver to the primary transceiver is accomplished by transferring the control signal from the secondary transceiver through a pass through enclosure to the primary transceiver, the pass through enclosure being capable of transferring or relaying the control signal between the secondary transceiver and the primary transceiver.

20. The process according to claim 15 wherein the need for a maintenance task required for the rolling mill bearing is determined by a process of roll neck antifriction bearing temperature monitoring.

21. The process according to claim 20 wherein the process for bearing temperature monitoring is accomplished by comparing a predicted end temperature, the predicted end temperature calculated by combining a temperature rise over ambient and a temperature gradient for the roll neck antifriction bearing to a current temperature of the rolling mill bearing using the following equations:

$$T = Ta + Trise\left(1 - e^{-\frac{1}{\tau}}\right)$$

$$\frac{dT}{dt} = \frac{Trise}{\tau} e^{-\frac{1}{\tau}}$$

$$Te = T + \frac{dT}{dt}\tau$$

Where:

T=current temperature indicated by the temperature sensors

Ta=ambient temperature

Trise=the ending temperature Te minus the ambient temperature Ta

τ=the time constant of the system specific to the specific heat and the lumped heat transfer coefficient $\frac{dT}{dt}$ = slope of the current temperature line.

22. The process according to claim 21 wherein a change in the temperature trend for the roll neck antifriction bearing over a plurality of temperature detection periods is used to determine a service requirement for the roll neck antifriction bearing.

23. A millstand for rolling metal shapes, said millstand comprising:

a housing having a window lined with side faces;

a chock located within the window and having side faces presented toward the side faces on the housing;

a roll supported on the housing and having a body and a roll neck at the end of the body, with the roll neck extending into the chock;

an antifriction bearing located between the roll neck and the chock for enabling the roll to rotate relative to the chock and the housing, the antifriction bearing including an outer race fitted into the chock, an inner race fitted around the roll neck, and rolling elements located between the inner and outer races;

sensors carried by the chock for sensing an operating condition of the antifriction bearing;

a chock transceiver carried by the chock capable of producing radio frequency signals that reflect conditions detected by the sensors, and also capable of receiving radio frequency signals;

a millstand transceiver positioned adjacent to the chock and being capable of transmitting radio signals to the chock transceiver and receiving radio frequency signals produced by the chock transceiver; and a pass through enclosure positioned between, and in general alignment with, the chock transceiver and the millstand transceiver, the pass through enclosure being capable of transferring or relaying the radio frequency signals transmitted between the chock transceiver and the millstand transceiver.

24. A millstand according to claim 23 and further comprising inductively transferring electrical energy from the millstand transceiver to the chock transceiver and using the electrical energy so transferred to produce the radio frequency signal, and wherein the pass through enclosure is capable of transferring or relaying the electrical energy from the millstand transceiver to the chock transceiver.

25. A millstand according to claim 23 wherein the chock transceiver is electronically identified by a unique serial number.

26. A millstand according to claim 25 wherein the unique serial number is used to compile historical operating and maintenance data for the chock electronically identified by the unique serial number.

27. A millstand according to claim 23 wherein at least one of the sensors detects the temperature of the antifriction bearing.

28. A millstand according to claim 27 wherein said one sensor detects the temperature of the outer race of the antifriction bearing.

29. A millstand according to claim 23 wherein the millstand transceiver is carried by the housing.

30. A millstand according to claim 29 wherein the chock contains a recess which opens out of one of its side faces, and the chock transceiver is in the recess; and wherein the housing contains a recess in one of the side faces that line its window, with the recess in the housing opening toward the recess in the chock; and wherein the chock transceiver is in the recess in the housing.

31. A millstand according to claim 29 wherein the chock transceiver, the pass through enclosure, and the millstand transceiver are inductively coupled to transmit electrical energy from the millstand transceiver to the chock transceiver to operate the chock transceiver.

32. The millstand according to claim 23 wherein the millstand includes a monitoring network which instructs the primary transceiver to generate a control signal to control an auxiliary component used to perform a maintenance function related to the operation of the millstand.

33. A process of monitoring and controlling the operation of a roll neck antifriction bearing that is fitted to a chock located in a housing of a millstand, said process comprising:
   a. at the chock, sensing an operating characteristic of the roll neck antifriction bearing;
   b. from within the chock, producing a first radio frequency signal that reflects the operating characteristic of the roll neck antifriction bearing;
   c. receiving the first radio frequency signal at a location remote from chock; and
   d. using the first radio frequency signal so received to assess a need for a maintenance task required for the roll neck antifriction bearing, wherein the need for a maintenance task required for the rolling mill bearing is determined by a process of roll neck antifriction bearing temperature monitoring, wherein the process for bearing temperature monitoring is accomplished by comparing a predicted end temperature, the predicted end temperature calculated by combining a temperature rise over ambient and a temperature gradient for the roll neck antifriction bearing to a current temperature of the rolling mill bearing using the following equations:

$$T = Ta + Trise\left(1 - e^{-\frac{1}{\tau}}\right)$$

$$\frac{dT}{dt} = \frac{Trise}{\tau} e^{-\frac{1}{\tau}}$$

$$Te = T + \frac{dT}{dt}\tau$$

Where:
   T=current temperature indicated by the temperature sensors
   Ta=ambient temperature
   Trise=the ending temperature Te minus the ambient temperature Ta
   τ=the time constant of the system specific to the specific heat and the lumped heat transfer coefficient $$\frac{dT}{dt} = \text{slope of the current temperature line.}$$

34. The process according to claim 33 wherein a change in the temperature trend for the roll neck antifriction bearing over a plurality of temperature detection periods is used to determine a service requirement for the roll neck antifriction bearing.

35. The process according to claim 34 further comprising a second radio frequency signal used to control an auxiliary component to perform a control function related to the need for maintenance for the roll neck antifriction bearing.

* * * * *